United States Patent [19]

Soni et al.

[11] Patent Number: 4,756,767

[45] Date of Patent: Jul. 12, 1988

[54] METHOD OF REMOVING SEALANT MATERIAL FROM WINDOW GLAZING PANEL

[75] Inventors: Natvar H. Soni, Elkhart, Ind.; Kenneth D. Kloosterman, Edwardsburg, Ind.; Denzil Abney, Fulton, Ky.

[73] Assignee: Excel Industries, Inc., Elkhart, Ind.

[21] Appl. No.: 47,111

[22] Filed: May 8, 1987

Related U.S. Application Data

[63] Continuation-in-part of Ser. No. 853,039, Apr. 17, 1986, abandoned.

[51] Int. Cl.4 ............................................. C23G 1/02
[52] U.S. Cl. ........................................ 134/3; 134/25.1; 134/25.4; 134/40; 252/DIG. 8
[58] Field of Search .................. 134/3, 25.1, 25.4, 26, 134/28, 38, 29, 40; 252/DIG. 8

[56] References Cited

U.S. PATENT DOCUMENTS 4,209,344  6/1980  Simon et al. ........................... 134/33
4,406,707  9/1983  Moore et al. ........................... 134/4

*Primary Examiner*—H. M. S. Sneed
*Assistant Examiner*—Sharon T. Cohen
*Attorney, Agent, or Firm*—Thomas J. Dodd

[57] ABSTRACT

A method of removing a gasket seal from a window glazing panel which includes immersing the panel and seal in non-volatile fluid. The glass and/or fluid is heated to soften the seal prior to removing the seal from the panel.

4 Claims, No Drawings

METHOD OF REMOVING SEALANT MATERIAL FROM WINDOW GLAZING PANEL

CROSS-REFERENCE TO RELATED APPLICATIONS

This application is a continuation-in-part of application Ser. No. 853,039, filed Apr. 17, 1986, now abandoned.

SUMMARY OF THE INVENTION

This invention relates to a method of removing sealant materials from smooth surfaces, particulary from window glazing panels.

Many window glazing panels are now manufactured and sold with a peripheral sealing gasket fixed to thee panel prior to installation. Occasionally, these windows are deemed defective because of a defective seal, improper adhesion of the seal to the panel, or other reasons unrelated to the glazing panel itself. Due to the high expense of the glazing panel relative to the seal, it is desirous to remove the seal from the panel while preserving the panel for future use. Previous methods of seal removal involved scraping the seal off the panel, which procedure was often ineffective and tended to damage the glass. Other removal methods, such as removing the seal with heat or solvents have often resulted in dangerous toxic gas emissions.

The method of this invention involves the immersion of the glazing panel and seal in water or other nonvolatile fluid for a predetermined time to soften the seal. The seal and fluid are heated to further soften the seal. Some fluids act to dissolve the seal while others require the seal to be pulled off the panel, usually by hand, and the glazing panel is then cleaned for reuse.

Accordingly, it is an object of this invention to provide for a novel method of removing a sealing gasket from a window glazing panel.

Another object of this invention is to provide for a window seal removal method which preserves the glazing panel for future use.

Another object of this invention is to provide for a window seal removal method which is safe and efficient.

Other objects of this invention will become apparent upon a reading of the following description.

DESCRIPTION OF THE PREFERRED EMBODIMENT

The preferred method herein described is not intended to be exhaustive or to limit the method to the precise steps or materials herein disclosed. It is chosen and described to explain the principles of the method and its application and practical use to enable others skilled in the art to practice the method.

The method of this invention has application to a sealing gasket, usually of polyurethane, formed about the periphery of a smooth surface object, namely a window glazing panel. Conventional adhesion promoters may be used to enhance adhesion of the gasket to the panel. This panel and seal combination can be formed by the RIM process which is well known in the industry.

In the event the sealing gasket must be removed from the panel, the panel and seal are immersed in a nonvolatile fluid (such as water) for a predetermined time which exceeds one hour. The panel is then removed from the fluid and allowed to dry at ambient temperature. If necessary, the panel is next washed with a solution of a dilute acid, such as dilute acetic acid (common vinegar).

The panel and seal are then heated to at least 200° F. for approximately one hour. By this time, the seal will be soft enough to simply be peeled off the panel by hand. After cleaning the panel periphery, the panel is returned to the assembly line for future use.

The following examples are submitted to illustrate the principles of the method.

EXAMPLE I

A window glazing panel which includes a polyurethane seal adhered to the panel periphery is immersed in lukewarm (68° F.) water for a period of 24 hours. The panel is removed and allowed to dry at ambient temperature. When completely dry, the panel is placed in an oven at 400° F. for one hour, and then removed. The polyurethane seal was then removed by pulling the seal from the window panel. The panel was then cleaned with warm water and returned to the assembly line for future use.

EXAMPLE 2

A window glazing panel which includes a polyurethane seal adhered to its periphery is immersed in hot (160°-180° F.) water for a period of 4 hours. The panel is removed, and then washed with common vinegar. The panel is then heated in an oven at 400° F. for one hour, removed and allowed to cool. The seal is removed by pulling and the window panel cleaned with warm water to remove any residue prior to returning the window to the assembly line future use.

An alternative method of seal removal involves the immersion of the panel and seal in a heated solution of a normally waxy polymeric compound. Preferred is a quantity of an oxyalkylene polymer such as methoxy polyethylene glycol sold by Union Carbide Corporation, Danbury, Conn. under the trademark CARBOWAX ®. The compound is heated to a temperature just below its boiling point or decomposition temperature to liquefy the compound and allow the parts to be immersed therein. After a relatively short time period of 10-120 minutes (90 minutes is preferred) in which the gasket is dissolved into the hot wax, the parts are removed, cleaned with a vinegar solution, and wiped dry. After several such operations the waxy solution may be replaced.

EXAMPLE 3

A window glazing panel which includes a polyurethane gasket seal adheared to its periphery is immersed in a heated (380° F.) vat which contains a quantity of CARBOWAX ®. (Decomposes at 392° F.) After 90 minutes, the panel is removed and, after cooling, is washed with vinegar and allowed to dry. The gasket seal was dissolved during immersion in the CARBOWAX ®.

It is understood that the invention is not limited to the above description but may be modified within the scope of the appended claims.

We claim:

1. A method of removing a gasket seal from an object having a smooth surface, said seal being adhered to said object smooth surface, said method comprising the steps of:

(a) heating a normally waxy polymeric compound to a temperature sufficient to liquefy the compound;

(b) immersing said object and seal in said liquefied compound until said seal is dissolved; and (c) removing said object from said liquefied compound and allowing the object to dry.

2. The method of claim 1 wherein said object and seal are immersed in said liquefied compound for a period of 10-120 minutes.

3. The method of claim 1 wherein said normally waxy polymeric compound is an oxyalkylene polymer.

4. The method of claim 1 wherein said polymeric material is methoxy polyethylene glycol and step (a) includes heating said polymeric material to a temperature just below the decomposition temperature.

* * * * *